(12) United States Patent
Stercho

(10) Patent No.: US 6,521,170 B2
(45) Date of Patent: Feb. 18, 2003

(54) REVAMPING OF A BASIC OXYGEN FURNACE INSTALLATION TO PROVIDE AN ELECTRIC FURNACE FACILITY

(75) Inventor: Michael J. Stercho, Wexford, PA (US)

(73) Assignee: SMS Demag Inc., Pittsburgh, PA (US)

( * ) Notice: Subject to any disclaimer, the term of this patent is extended or adjusted under 35 U.S.C. 154(b) by 0 days.

(21) Appl. No.: 09/738,095

(22) Filed: Dec. 16, 2000

(65) Prior Publication Data

US 2002/0088102 A1 Jul. 11, 2002

(51) Int. Cl.⁷ ................................................ C21B 7/00
(52) U.S. Cl. ..................... 266/44; 266/142; 266/DIG. 1
(58) Field of Search ........................... 266/DIG. 1, 142, 266/44

(56) References Cited

U.S. PATENT DOCUMENTS 4,402,083 A * 8/1983 Paskarbeit et al. ............ 373/79
5,827,473 A * 10/1998 den Hartog .................. 266/44

FOREIGN PATENT DOCUMENTS

JP 406049521 A * 2/1994 ............ 266/DIG. 1

* cited by examiner

Primary Examiner—Scott Kastler
(74) Attorney, Agent, or Firm—Clifford A. Poff

(57) ABSTRACT

An existing steel making installation having a basic oxygen furnace facility is converted to an electric arc furnace facility for refining steel by modifying the furnace support pedestals to form spaced apart horizontal rail support pads and spaced apart rails are mounted on the pads and a superstructure extending horizontally at one side of the space formally occupied by the basic oxygen furnace. An electric arc furnace is mounted on a furnace transfer car for movement along newly installed horizontal rails between a furnace operating position and a furnace exchange position. The electric furnace having a tapping orifice for discharging treated steel and a slag discharge trough. Ladle transfer cars previously used for handling slag and steel from the basic oxygen furnace are reused for the same purpose during operation of the electric arc furnace. A fume opening in the electric furnace roof is connected by a vertical fume section and an elbow to the existing fume system. Bins used for supplying materials to the basic oxygen furnace are used to supply in some instances different materials to the electric arc furnace.

17 Claims, 7 Drawing Sheets

REVAMPING OF A BASIC OXYGEN FURNACE INSTALLATION TO PROVIDE AN ELECTRIC FURNACE FACILITY

CROSS REFERENCE TO RELATED APPLICATIONS

This application is related to patent application Ser. No. 09/737,440 filed Dec. 12, 2000 entitled Electric furnace for steel making.

BACKGROUND OF THE INVENTION

1. Field of the Invention

The present invention relates to converting from the use of a basic oxygen furnace in an existing steel making facility to the use of an electric furnace and more particularly to effecting such a conversion by minimizing disruption to existing operation of the facility and using existing material and flow paths.

2. Description of the Prior Art

Steel making facilities used blast furnaces extensively in the past to provide a supply of liquid iron for conversion to steel. Open hearth furnaces used for the conversion process were replaced by oxygen steel making process used extensively for the conversion process. Oxygen is introduced through, onto or over a bath containing blast furnace iron, steel scrap and fluxes. The facility required for the oxygen steel making process include not only a large open top refractory liquid vessel but also slag and steel transfer ladles as well as storage bunker and conveying equipment for the fluxes and scrap. Blast furnaces represent an extensive capital investment and maintenance costs. Direct reduction is sometimes a less expensive alternative supply of iron and an abundant supply of scrap are large reducing the demand for iron. As blast furnaces are taken out of service and not replaced, the investment in the facility for the oxygen steel making process is a loss because of the loss of the source of liquid iron.

It is an object of the present invention to provide an economical way to convert basic oxygen furnace equipment by making extensive continued reuse of ancillary equipment with a newly installed electric furnace.

It is another object of the present invention to provide for the modification of the foundation for a basic oxygen furnace vessel to support an electric furnace and allow continued use of ladle transfer cars for slag and tapped steel.

It is a further object of the present invention to provide a method for relatively rapid replacement of a basic oxygen furnace with an electric furnace to minimize loss of production.

BRIEF SUMMARY OF THE INVENTION

According to the present invention there is provided in a steel making installation having a basic oxygen furnace facility essentially including basic oxygen furnace vessel, pedestal bearings, furnace support pedestals, furnace tilting drive, oxygen lance, fume duct cleaning, flux additive system, ladle alloy addition system, and scrap handling systems, a method for revamping the steel making installation to convert the basic oxygen furnace facility to an electric furnace facility, the method including the steps of discarding each of the basic oxygen furnace vessel, pedestal bearings, furnace tilting drive and oxygen lance, modifying the furnace support pedestals to form spaced apart horizontal rail support pads extending generally horizontally between a furnace operating position and a furnace exchange position, installing car rails on the spaced apart horizontal rail support pads, installing an electric furnace on a transfer car for movement along the car rails between the operating position and the furnace exchange position, the electric furnace having a tapping orifice for discharging treated steel and a fume opening for discharging an exhaust fume while residing at the furnace operating position, and modifying each of the fume duct, flux additive system, ladle alloy addition system, and scrap handling systems to establish operative communication with the electric furnace at the furnace operating position.

According to another aspect of the present invention, there is provided an apparatus for revamping a steel making furnace installation to convert a basic oxygen furnace facility to an electric furnace facility, the basic oxygen furnace facility essentially including bearing pedestals to pivotally support a basic oxygen furnace vessel, a fume duct and transfer cars for ladles containing tapped steel and slag, the apparatus including the combination of spaced apart horizontal rails supported by the bearing pedestals, an electric furnace supported on a transfer car for movement along the rails between an operating position formerly occupied by basic oxygen furnace when supported by the bearing pedestals and a furnace exchange position, the electric arc furnace having a tapping orifice for discharging a burden treated in the furnace and a fume discharge opening, the furnace being position by the rails for tapping steel and slag to ladles on the transfer cars, and fume duct sections for delivering a fume received from the fume discharge opening to the fume duct.

BRIEF DESCRIPTION OF THE SEVERAL VIEWS OF THE DRAWINGS

The present invention will be more fully understood when the following description is read in light of the accompanying drawings in which.

DETAILED DESCRIPTION OF THE INVENTION

Figure 1:
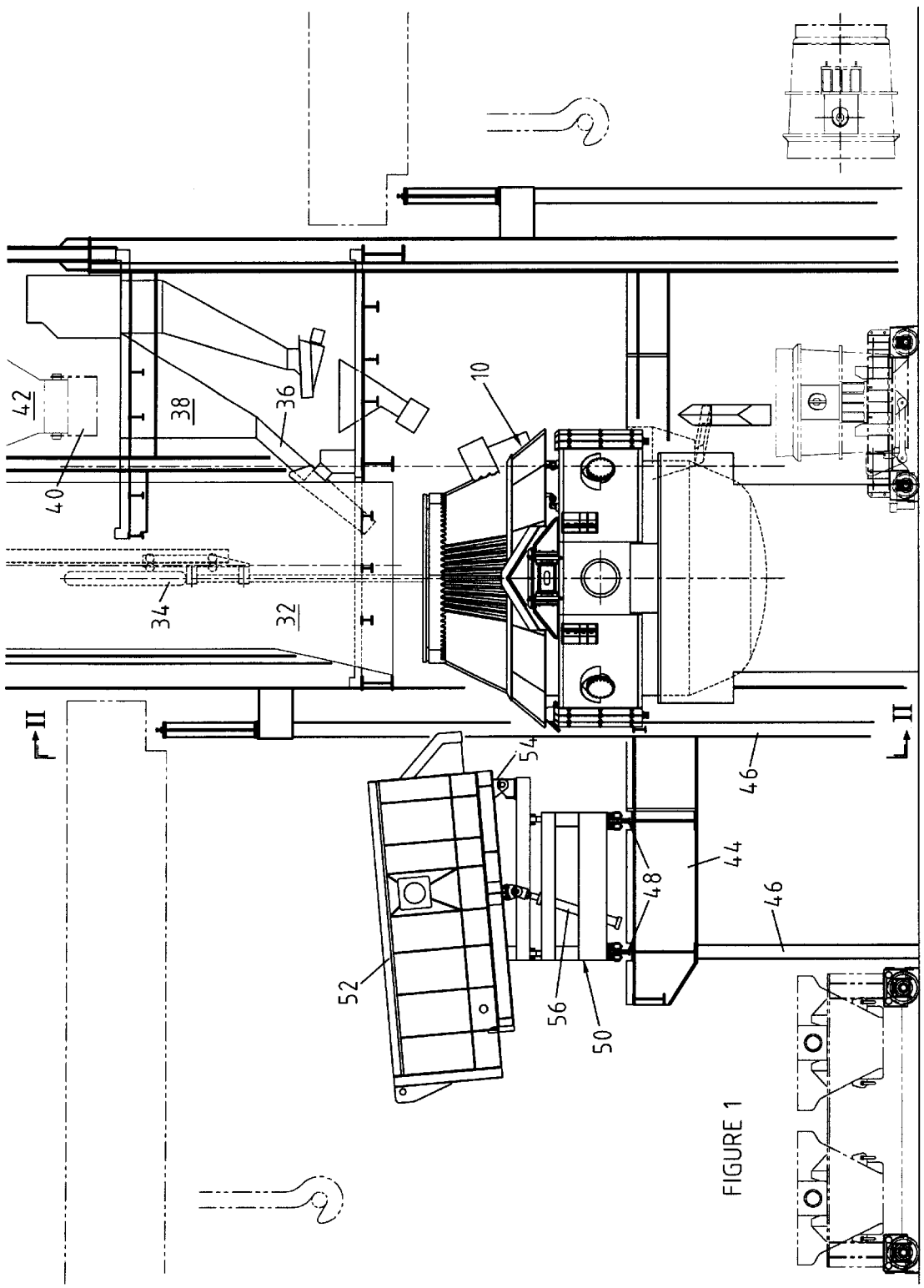
FIG. 1 is a side elevational view of a basic oxygen furnace facility.
Figure 2:
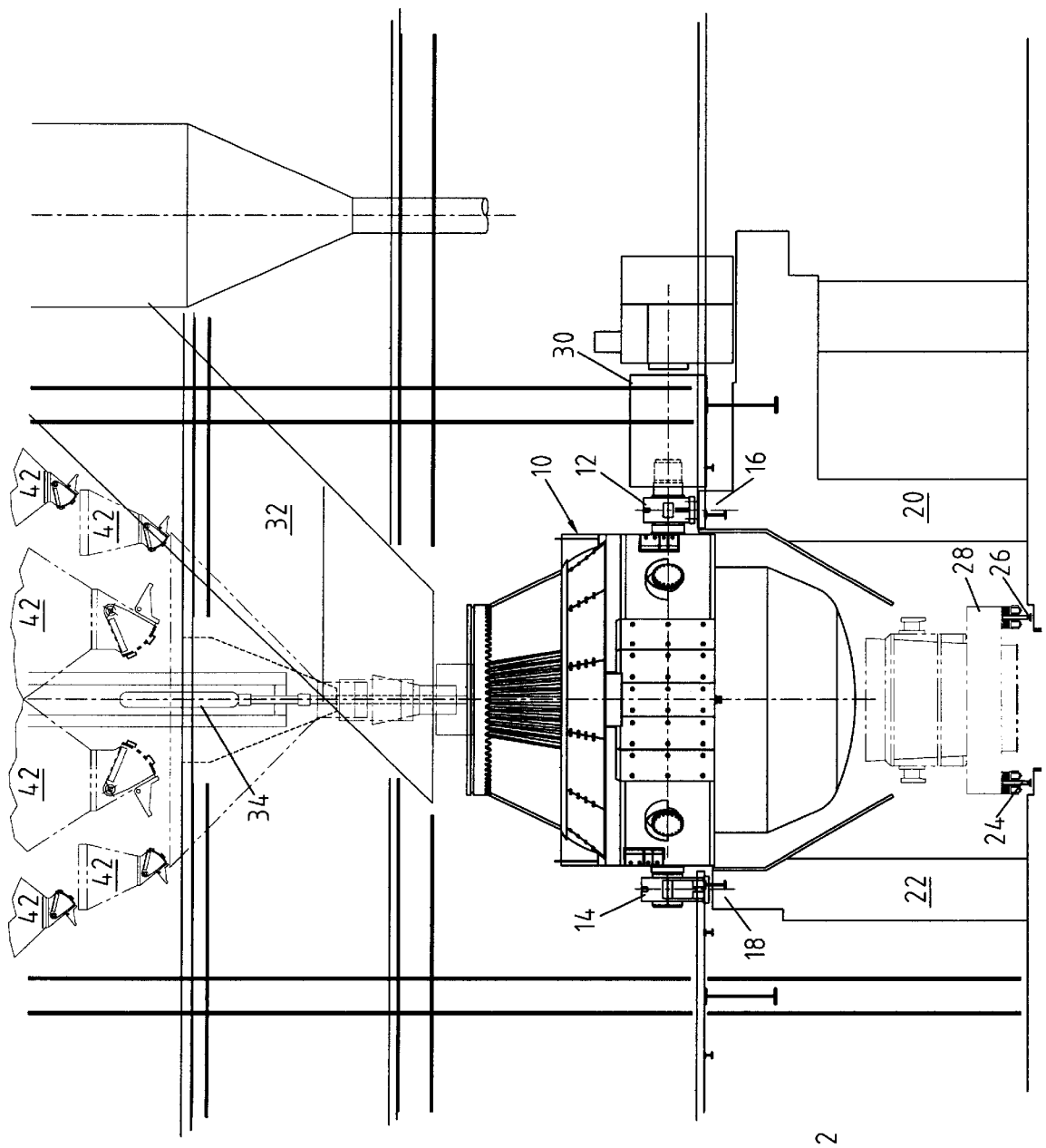
FIG. 2 is a front elevation view taken along lines II—II of FIG. 1.

In FIGS. 1 and 2 there is illustrated an example of a basic oxygen furnace facility suitable for modification according to the present invention to provide for the installation and operation of an electric furnace. A basic oxygen furnace 10 has trunnions extending from diametrically opposite sides of the furnace and mounted in bearing assemblies 12 and 14 that are in turn supported by upstanding bearing pedestals 16 and 18 carried by massive reinforced foundation pedestals 20 and 22. Rails 24 and 26 extend in the space between the foundation pedestals for the movement of a plurality of transfer cars 28 used to transport ladles containing tapped steel and slag incident to the operation of the basic oxygen furnace. A trunnion pin for the furnace projects beyond the bearing assembly 12 for connection by a coupling to a furnace tilting drive 30 that is operated to tilt the furnace in a direction to drain slag over the furnace mouth opening lip into a slag pot on one of the transfer cars 28. The furnace is tilted in the opposite direction by drive 30 to supply liquid steel through an opening in the furnace wall to a teeming ladle on another of the transfer cars 28. A large opening in the top of the furnace discharges fume into an overlying fume collection and cooling hood 32 which supplies the fume to an evaporation chamber and filter equipment, not shown, to recover pollutants. The hood extends upwardly in an acute angle to the vertical and is provided with an opening in the upwardly directed wall of the hood to introduce an oxygen lance 34 through the opening in the overlying fume cooling hood 32 and into the basic oxygen furnace 10 for introducing oxygen to the surface or into the metal in the furnace. It is, however, within the scope of the present invention to modify a basic oxygen furnace installation where the furnace is provided with a tuyerse in the bottom for the introduction of oxygen commonly known as Q-BOP. Another opening in the lower end of the overlying fume cooling hood receives a duct 36 connected to a hopper 38 which is supplied with fluxing and additive materials by conveyors 40 extending to a plurality of side-by-side storage bins 42. Building columns are used to form supports for floors at various elevations throughout the facility and provide access to the ancillary equipment such as the storage bins 42. There is illustrated a floor 44 supported by pillars 46 above ground level to carry rails 48 for a scrap charging car 50. The car 50 supports a scrap box 52 that can pivot about a shaft 54 by operation of a piston and cylinder assembly 56. Shown in FIG. 2 is a ladle alloying station 58 located at a laterally spaced site at the furnace and used to deliver alloying materials from a hopper 60 located above a ladle on a transfer car 28. Sometimes there is no car and the scrap boxes are charged by means of an overhead crane.

The present invention seeks to maintain the material and process flow paths of the basic oxygen furnace installation by using the output from an electric furnace to provide supplies of liquid steel for use as consumed previously by the basic oxygen furnace. The conversion process is devised to minimize disruptions to the existing operations of the existing installation and minimize costs to the extent possible by the reuse of existing equipment and buildings. The design of the electric furnace used in the conversion according to the present invention permits operation of the furnace without requiring an overhead crane to charge the furnace and lift furnace components from their operating location. It is necessary however to abandon the basic oxygen furnace vessel 10, the bearing assemblies 12 and 14 and furnace tilt drive 30 as well as the bearing pedestals 16 and 18. Part of the fume cooling hood 32 and some but not all of the flux additive systems formed by the plurality of side-by-side bins 42 and the fluxing and additive conveyor system will be abandon.

Figure 3:
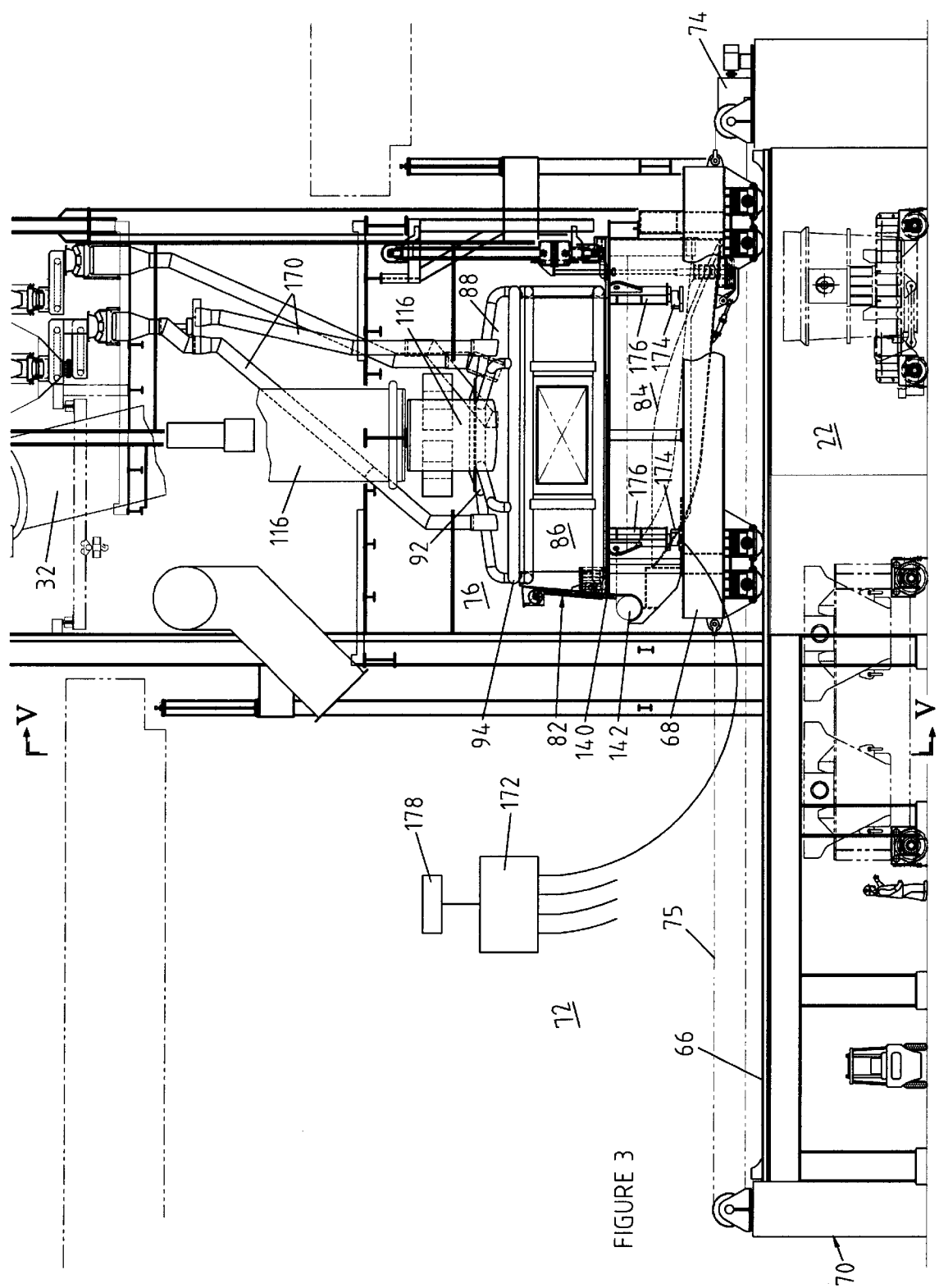
FIG. 3 is a side elevational view illustrating an electric furnace installation using existing and modifications to the facilities shown in FIGS. 1 and 2.
Figure 4:
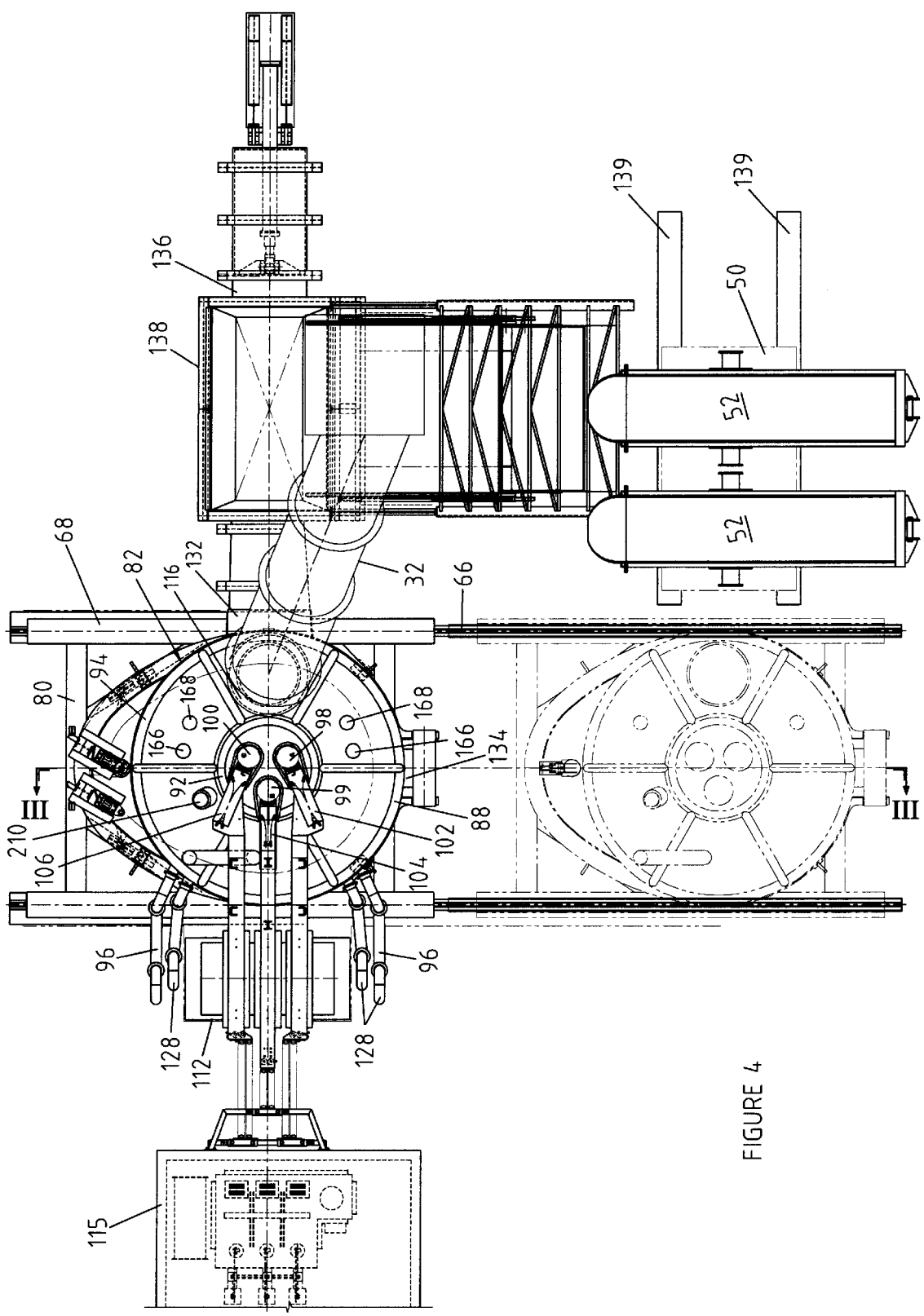
FIG. 4 is a plan view of the electric furnace shown in FIG. 3.
Figure 5:
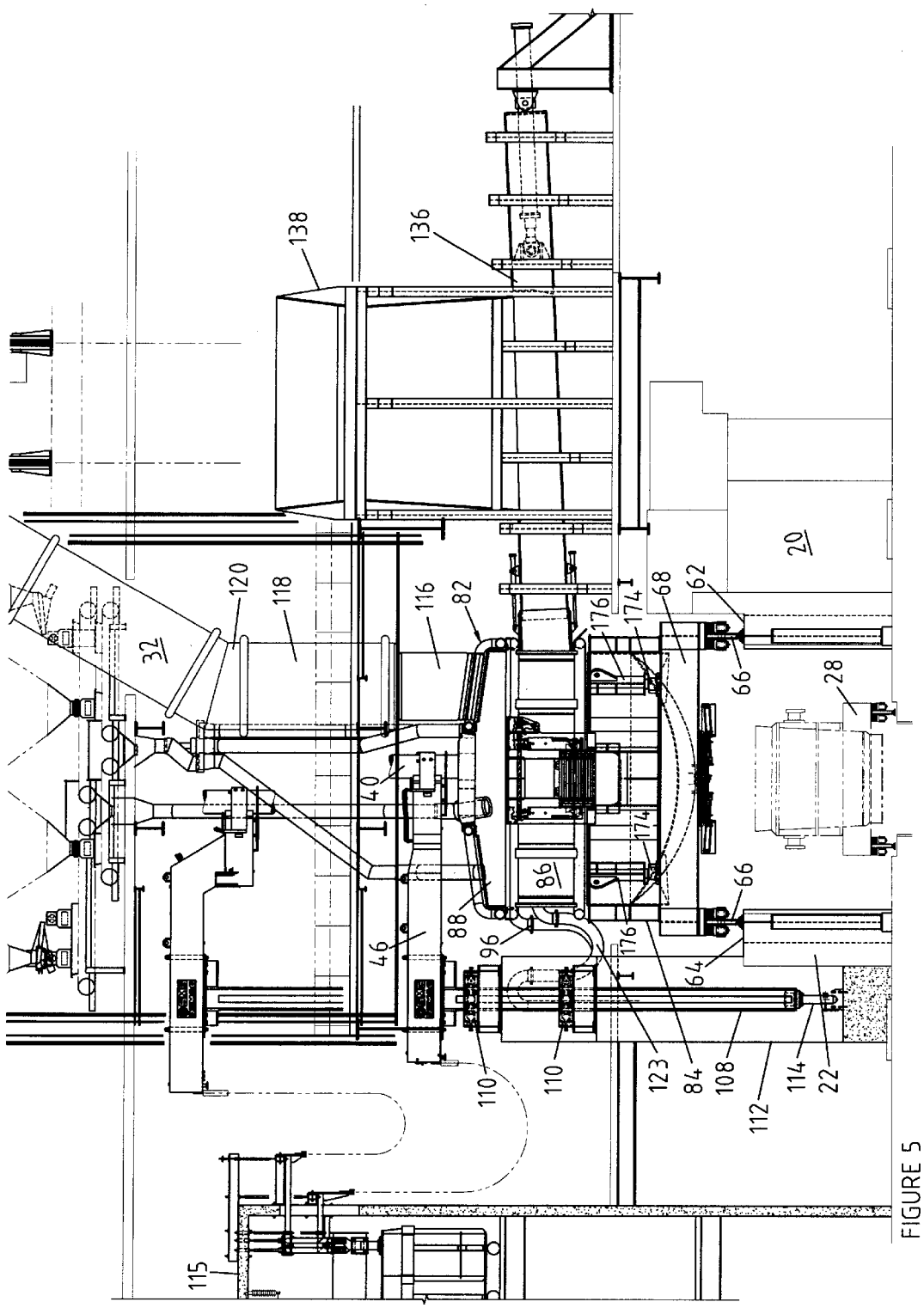
FIG. 5 is a front elevational view taken along lines V—V of FIG. 3.

As shown in FIGS. 3–5, ladle transfer cars 28 remain unchanged for movement along the same rails 24 and 26. The foundation pedestals 20 and 22 are modified by the removal of the bearing pedestals 16 and 18 and foundation pedestal 20 altered by forming a shelf 62 at the same elevation as the upper face surface 64 of foundation pedestal 22. Shelf 62 and surface 64 serves as support pads for rails 66 used to support a furnace transfer car 68. The rails extend beyond the existing foundation pedestals 20 and 22 to an adjacent bay in the steel making facility where the rails are supported by a superstructure 70 and form a furnace exchange site 72. The furnace transfer car is provided with wheels for movement by a winch 74 from a furnace operating position 76 where the transfer car is secured against movement against a stop by a ratchet, not shown. The winch 74 includes a cable 75 secured to opposite ends of the furnace transfer car. The furnace transfer car includes a furnace support frame 80 on which there is mounted an electric arc furnace 82 formed by a lower furnace shell 84, an upper furnace shell 86 and a furnace roof 88. The furnace roof 88 includes roof panels formed by an array of side-by-side coolant pipes with the coolant passageways communicating with annular upper and lower water supply headers 92 and 94, respectively, interconnected by radial distributing pipes to form a water circulating system communicating with service lines 96 containing water supply and return lines. The service lines 96 include a flexible section to avoid the need to disconnect the service lines when it is desired to lift the furnace roof alone or combined with the upper furnace shell a short distance, e.g., 24 inches, for servicing the lower furnace shell. The upper water supply header 92 encircles a triangular array of three apertures in a roof insert 94. The apertures are dimensional and arranged to receive the phase A, B and C electrodes 98, 99 and 100 supported by electrode support arms 102, 104 and 106, respectively. Each of the electrode support arms is independently positioned vertically by support posts 108 restrained by horizontally spaced guides 110 in a newly formed superstructure 112 for vertical displacement by actuator 114 typical in the form of piston and cylinder assembly. The electrode support arms 102, 104 and 106 support water cooled cables for transmission of electrical current from transformers in a transformer vault 115 to the respective phase A, B and C electrodes.

A fume duct 116 extends vertically from an annular opening in the furnace roof between the upper and lower water supply headers 92 and 94 for exhausting fumes from the interior of the furnace to an enlarged and vertically spaced duct section 118. The vertical duct section 118 forms a replacement to a discarded section of the overlying fume hood 32. The vertical duct section 118 is joined to the remnant of the overlying fume hood 32 by the elbow 120. The duct 118 and elbow 120 are formed by side-by-side coolant pipes to provide thermal protection, the same construction as the overlying fume hood 32.

The furnace upper shell includes superimposed convolutions of coolant pipe supplied with coolant from spaced apart supply headers that are interconnected by vertical distribution pipes to form a water circulating system communicating with service lines 128 containing water supply and return lines. Metal panels may be supported by the coolant pipes of the furnace roof and the coolant pipe of the furnace upper shell for confinement of the fume to the interiors of these furnace components. The service lines 128 include a flexible section to avoid the need to disconnect the service lines when it is desired to lift the furnace roof combined with the upper furnace shell a short distance, e.g., 24 inches, for servicing the lower furnace shell. The convolutions of coolant pipe forming the upper furnace shell 86 are interrupted by a scrap charge opening 132 in one quadrant and a slag discharge opening 134 in an adjacent quadrant of the annular configuration shell. The scrap charge opening 134 is used to introduce quantities of scrap at closely spaced apart intervals throughout the major portion of the furnace operating cycle and the scrap residing in a retractable chute of a scrap charger 136 serves as a media to prevent unwanted escape of the fume from the furnace in the scrap charger. A bunker 138 embodies a fabricated construction to supply scrap to the scrap charger 136. The scrap charger car 50 is relocated to move along installed rails 139. A slag door 140 is lifted to allow the flow of slag beyond a threshold formed by a carbon rod insert 142 which is supported by suitable brackets on the lower furnace shell 84 to a slag pot on a transfer car 28.

The furnace charging material for the most common steel making operation will be scrap which is preferable continuously introduced at closely spaced time increments. In addition to the charging of the furnace with scrap, direct reduction pellets, DRI, may be introduced to an opening 162, shown in FIG. 4, in the roof insert by a chute 164 extending from a DRI storage hopper. The chute 164 is arranged at an angular relation to the vertical so that the DRI impacts with the metal bath at a site proximate to the triangular array of electrodes to take advantage of the highly heated area in the metal bath for rapidly melting the pellets of DRI material. There are additional openings 166 and 168 in the furnace roof. Openings 166 are used to insert carbon/oxygen lances, shown in FIG. 6, for producing foamy slag. Openings 168 communicate with chutes 170 for introducing fluxing and carbon materials to the melt in the furnace. Liquid metal may also form a furnace charge or a part thereof. Typically, the liquid metal will comprise blast furnace iron when available and can be introduced to the furnace by use of a pouring tundish wheels arranged for supporting the tundish on the rails 74 and 76. The tundish will include a launder arranged to allow the introduction of liquid metal through openings formed by the slag discharge trough. A ladle will be carried by crane to tundish for introducing liquid metal to the tundish.

The refractory lining in the lower furnace shell is preferably constructed to allow a larger tonnage output at a shorter furnace operating cycle by maintaining a liquid metal heel provided by the configuration of the liquid metal cavity in the refractory after tapping is at least 70% preferably 100% of the heat before tapping. Such a liquid metal heel provides a substantial thermal benefit after tapping to maintain flat bath operation throughout the charging of scrap and/or other forms for charging material. Melting a newly introduced scrap charge combined with the introduction of heat by operation of electrodes can continue throughout the charging of the furnace. FIG. 3 illustrates the use of a control 172 typically located in an operator pulpit and having a summation circuit receiving input signals from the load cells 174 on the furnace support frame 80 in load bearing contact with struts 176 affixed to the outer surface of the lower furnace shell 84. Electrical signals supplied by the load cells 174 corresponding to the weight of the furnace including the liquid metal heat which is modified by a signal to provide an output signal representing only the weight of the liquid metal heat. The weight of the liquid metal heat may be displayed in any convenient way such as a numerical read out 178. The read out will be used to control the furnace operation including start and stop of charging and tapping.

Mechanical shock due to tilting of the furnace in opposite directions for tapping and slag off is eliminated throughout the furnace operation cycle. The feature of operating the furnace while completely static, serves also to shorten the operating cycle time by allowing power on the electrodes throughout tapping, slagging and charging. Also, tapping of a heat is simplified as compared with tapping a basic oxygen furnace because the ladles receiving slag and the stream of liquid steel remain stationary because the furnace is stationary throughout its operation.

Figure 6:
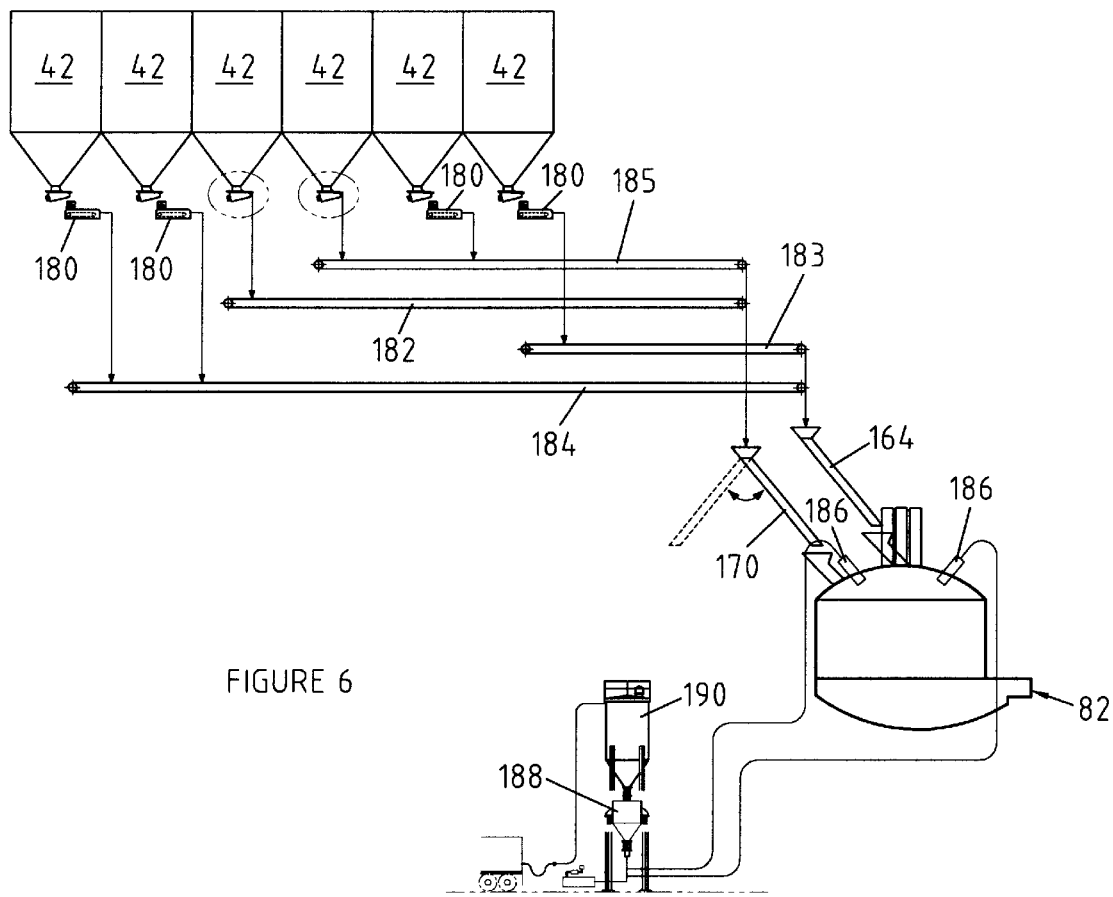
FIG. 6 is a schematic illustration of the material storage and handling systems for the electric furnace of FIGS. 3–5.
Figure 7:
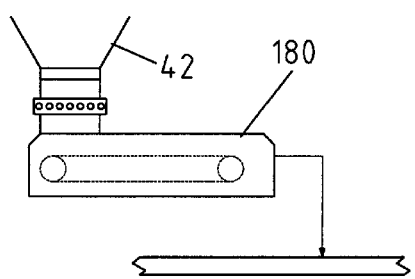
FIG. 7 is a schematic illustration of a volume metric feeder for delivering material from a hopper to a new conveyor system according to the present invention.
Figure 8:
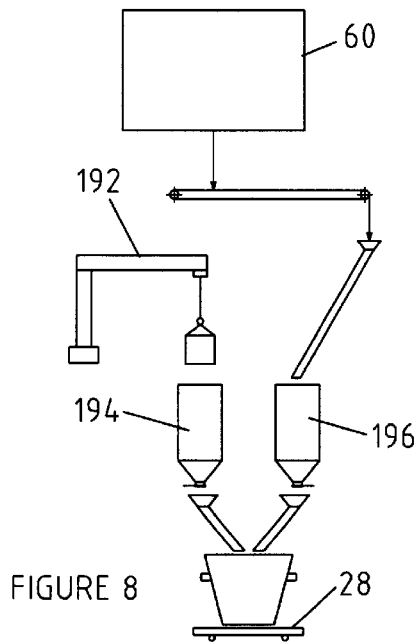
FIG. 8 is a schematic illustration of a conveyance system for supplying alloys to a ladle containing tapped steel at an alloying station.

FIG. 6 schematically illustrates the continued use of bins 42 for direct reduction iron pellets which pass through gravimetric feeders 180, as shown in FIG. 7, that are added to each of the bins for delivery of the pellets to suitably arranged conveyors 182 and 183 for introduction into the furnace using chute 164. Another suitably arranged conveyors 184 and 185 supplies dolomite, lime, and carbon from respective supplies in individual ones of the bin's 42 to the furnace using chutes 170. The opening 166 in the furnace roof receives carbon/oxygen lances 186 connected by and using volume metric or gravimetric control supply lines to a batching hopper 188 communicating with a foaming slag carbon silo 190. The alloy station is relocated and expanded by the addition of a synthetic slag feed system that includes the addition of a jib crane 192 for introducing synthetic slag to a hopper 194 which in turn discharges desired quantities of synthetic slag through a chute to a ladle on a transfer car 28. Another chute, conducts a desired quantity of alloy material from a hopper 60 receiving supplies of alloy material from the relocated alloying supply vessel 198.

Figure 9:
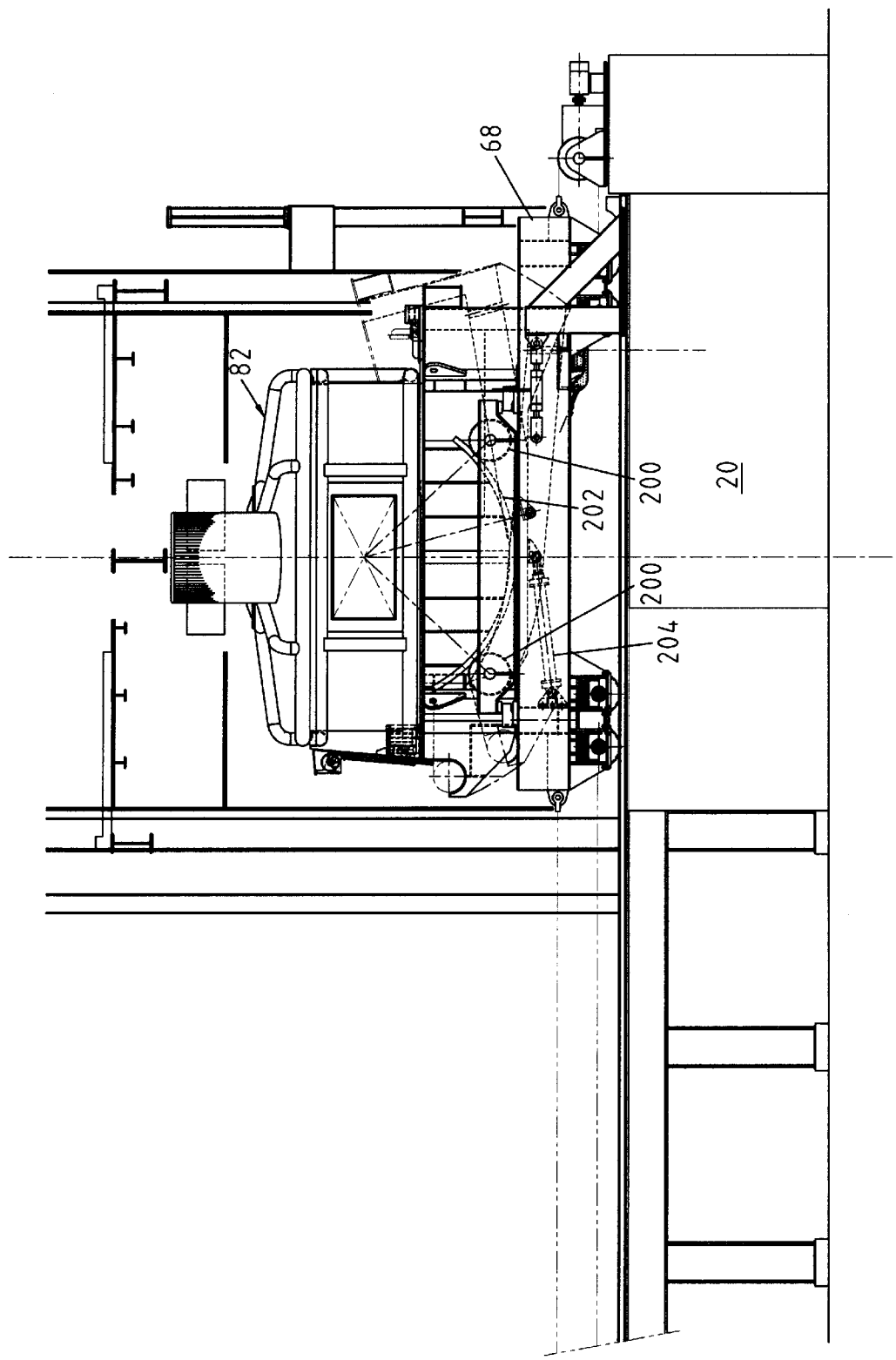
FIG. 9 is an enlarged fragmentary illustration of a modification to the electric arc furnace shown in FIGS. 3–5.

FIGS. 3–5 illustrate the preferred form of an electric furnace to carry out the conversion of a basic oxygen furnace installation. FIG. 9 illustrates a modification to the electric arc furnace which essentially provides for the pivotal support of the lower furnace shell on the furnace car. For this purpose the furnace support frame 80 is provided with spaced apart rollers 200 rotatably supported by bearing assemblies. The bottom of the lower furnace shell is provided with spaced apart arcuate bars 202 in load bearing contact with the rollers 200. The entire furnace is supported on the furnace car by the rollers and can be tilted in opposite directions by operation of a piston cylinder assembly 204 mounted on the furnace car and its rod end clevis mounted to the lower furnace shell. The construction of the furnace in all other respects will be the same as shown in FIGS. 3–5 and described hereinbefore. However, the present invention is equally applicable to other well known forms of steel making furnaces. For example, arc heating furnaces used to heat a metal charge by heat radiation from arcs passed between electrodes above the metal charge. Other furnace designs include an electrically conductive furnace bottom which forms part of an electrical circuit powered by direct current. Induction furnaces can also be installed which operate to heat a metal charge by either using inductors according to a transformer principle where the secondary winding is formed by a loop of liquid metal in a refractory channel or a coreless principle where induction coils surround the furnace wall and generates a magnetic field to impart energy to the metal charge in the furnace.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. In a steel making installation having a basic oxygen furnace facility essentially including basic oxygen furnace vessel, pedestal bearings, furnace support pedestals, furnace tilting drive, oxygen lance, fume duct, flux additive system, ladle alloy addition system, and scrap handling systems, a method for revamping said steel making installation to convert the basic oxygen furnace facility to an electric furnace facility, said method including the steps of:

discarding each of said basic oxygen furnace vessel, pedestal bearings, furnace tilting drive and oxygen lance;

modifying said furnace support pedestals to form spaced apart horizontal rail support pads extending generally horizontally between a furnace operating position and a furnace exchange position;

installing car rails on said spaced apart horizontal rail support pads;

installing an electric furnace on a transfer car for movement along said car rails between said operating position and said furnace exchange position, the electric furnace having a tapping orifice for discharging treated steel and a fume opening for discharging exhaust fume while residing at said furnace operating position; and modifying each of said fume duct, flux additive system, ladle alloy addition system, and scrap handling systems to establish operative communication with said electric furnace at said furnace operating position.

2. The method according to claim 1 wherein said spaced apart horizontal rail support pads are established at an elevation sufficient to allow continued use of ladle cars.

3. The method according to claim 1 further including installing a scrap charger for introducing scrap through an opening in the side wall of said electric furnace.

4. The method according to claim 1 wherein said step of modifying a fume duct includes operatively coupling said fume duct to said furnace by adding a fume duct elbow to a vertical fume duct section extending to a roof opening in said electric furnace.

5. The method according to claim 1 wherein said basic oxygen furnace facility includes a plurality of hoppers and wherein said method includes the further step of using of some plurality of hoppers for introducing direct reduced iron pellets into said electric furnace.

6. The method according to claim 5 including the further step of providing conveyors for delivering direct reduced iron pellets from said hoppers to chutes for introducing in said electric furnace.

7. The method according to claim 1 wherein said basic oxygen furnace facility includes a plurality of hoppers and wherein said method includes the further step of using of some plurality of hoppers for introducing dolomite, lime and carbon into said electric furnace.

8. The method according to claim 7 including the further step of providing conveyors for delivering dolomite, lime and carbon from said hoppers to chutes for introducing in said electric furnace.

9. The method according to claim 1 wherein said electric furnace includes a plurality of electrodes extending through apertures in a furnace roof for establishing arcs to heat a furnace charge.

10. The method according to claim 8 wherein said electric art are maintained through consecutive operating cycles of said electric furnace.

11. The method according to claim 8 wherein said electric furnace includes a lower furnace shell with containing a tape hole in the tapping directly to a lade on a transfer car beneath said electric furnace.

12. A method for revamping a steel making furnace installation to convert a basic oxygen furnace facility to an electric arc furnace facility, said basic oxygen furnace facility essentially including basic oxygen furnace vessel, bearing pedestals, furnace tilting drive, oxygen lance, fume duct, transfer cars for ladles containing tapped steel and slag, said method including the steps of:

discarding basic oxygen furnace vessel, bearing pedestals, furnace tilting drive and oxygen lance;

using existing bearing pedestals to support spaced apart horizontal rails;

installing an electric arc furnace on a transfer car moveable along said rails between an operating position and a furnace exchange position, the electric arc furnace having a tapping orifice for discharging a burden treated in the furnace and a fume discharge opening;

coupling said fume discharge opening to said fume duct; and using said transfer cars for ladles containing tapped steel and slag to transport steel and slag from said electric furnace.

13. An apparatus for revamping a steel making furnace installation to convert a basic oxygen furnace facility to an electric furnace facility, said basic oxygen furnace facility essentially including bearing pedestals to pivotally support a basic oxygen furnace vessel, a fume duct and transfer cars for ladles containing tapped steel and slag, said apparatus including the combination of:

spaced apart horizontal rails supported by said bearing pedestals;

an electric furnace supported on a transfer car for movement along said rails between an operating position formerly occupied by basic oxygen furnace when supported by said bearing pedestals and a furnace exchange position, the electric arc furnace having a tapping orifice for discharging a burden treated in the furnace and a fume discharge opening, said furnace being position by said rails for tapping steel and slag to ladles on said transfer cars; and fume duct sections for delivering fume received from said fume discharge opening to said fume duct.

14. The apparatus according to claim 13 further including conveyors and discharge chutes for introducing direct reduced iron ore pellets and dolomite, lime and carbon into a roof of said electric furnace.

15. The apparatus according to claim 13 further including a scrap charger extending horizontally at one side of electric furnace for introducing scrap through an aperature in a side wall of said electric furnace.

16. The apparatus according to claim 13 further including a plurality of electrodes extending through apertures in a roof of said-electric for establishing arcs to heat a furnace charge.

17. The apparatus according to claim 13 further including a fume duct elbow and a vertical flume duct section for delivering fume from an opening in a roof of said electric furnace to fume duct forming part of said basic oxygen furnace facility.

* * * * *